United States Patent
Haigh et al.

(10) Patent No.: US 7,166,023 B2
(45) Date of Patent: Jan. 23, 2007

(54) VENT ASSEMBLY WITH SINGLE PIECE COVER

(75) Inventors: James A. Haigh, Shelby Township, MI (US); Richard J. Iminski, St. Clair Shores, MI (US); Philip K. Truscott, Metamora, MI (US)

(73) Assignee: Transpec, Inc., Sterling Heights, MI (US)

( * ) Notice: Subject to any disclaimer, the term of this patent is extended or adjusted under 35 U.S.C. 154(b) by 0 days.

(21) Appl. No.: 10/503,190

(22) PCT Filed: Jun. 20, 2003

(86) PCT No.: PCT/US03/19417

§ 371 (c)(1),
(2), (4) Date: Jul. 29, 2004

(87) PCT Pub. No.: WO04/000587

PCT Pub. Date: Dec. 31, 2003

(65) Prior Publication Data

US 2005/0095972 A1     May 5, 2005

Related U.S. Application Data

(60) Provisional application No. 60/390,375, filed on Jun. 21, 2002.

(51) Int. Cl.
*B60H 1/26*     (2006.01)

(52) U.S. Cl. .................................................. 454/136
(58) Field of Classification Search ................ 454/136, 454/137, 162

See application file for complete search history.

(56) References Cited

U.S. PATENT DOCUMENTS

| | | | |
|---|---|---|---|
| 1,983,979 A * | 12/1934 | Graham | 454/117 |
| 2,211,367 A | 8/1940 | Davey et al. | |
| 2,550,353 A * | 4/1951 | Hopfinger | 454/136 |
| 4,090,436 A | 5/1978 | Wright | |
| 4,433,506 A | 2/1984 | Manning | |
| 4,592,269 A * | 6/1986 | Lamparter | 454/115 |
| 4,690,040 A | 9/1987 | Barnett | |
| 4,895,065 A | 1/1990 | Lamparter | |
| 4,964,673 A | 10/1990 | Lamparter | |
| 5,054,377 A | 10/1991 | Mochel et al. | |
| 5,344,361 A * | 9/1994 | Matthias | 454/129 |
| 5,918,972 A | 7/1999 | VanBelle | |
| 6,572,182 B2 | 6/2003 | Lamparter et al. | |

* cited by examiner

*Primary Examiner*—Gregory Wilson
(74) *Attorney, Agent, or Firm*—Reising, Ethington, Barnes, Kisselle, P.C.

(57) ABSTRACT

A vent assembly has a base and a single piece cover that is attached to the base to form a housing. A partition inside the housing forms an upper compartment that communicates with an outlet at the rear of the cover and a lower compartment that communicates with an inlet through the base. The compartments communicate via an opening through the partition. The partition provides an exhaust passage from the opening to the outlet at the rear of the cover and a barrier to the flow of water from the outlet back to the opening. The partition and cover provide a drain passage from the exhaust passage back to the outlet in case water accumulates near the opening. The vent assembly may be static or include a fan unit to provide a powered vent assembly. Either may be used as the hatch of a combined vent and escape hatch assembly.

22 Claims, 9 Drawing Sheets

VENT ASSEMBLY WITH SINGLE PIECE COVER

RELATED APPLICATIONS

This patent application claims priority of Provisional Patent Application No. 60/390,375 filed Jun. 21, 2002.

FIELD OF THE INVENTION

This invention relates to vent assemblies for mounting on vehicle roofs, particularly, roofs of school and transit busses.

BACKGROUND OF THE INVENTION

U.S. Pat. No. 4,592,269 granted to Ronald C. Lamparter Jun. 3, 1986 for a static vent device discloses a static vent assembly for a vehicle such as a school or transit bus wherein the interior of the vehicle is continuously vented to the atmosphere in such a way as to prevent the ingress of rain water into the passenger compartment.

U.S. Pat. No. 4,895,065 granted to Ronald C. Lamparter Jan. 23, 1990 for a combined static and powered vent assembly discloses a combined static and powered vent assembly for a vehicle such as a school or transit bus wherein the interior of the vehicle is continuously vented to the atmosphere in such a way that the forward movement of the bus causes an eductive drawing of air from the vehicle interior and which also includes a powered fan device for venting the vehicle interior when static or eductive venting is inadequate.

U.S. Pat. No. 4,433,506 granted to Donald L. Manning discloses a combined vent and escape hatch for a vehicle such as a school or transit bus which has a lid or cover for the vehicle roof opening. The cover has two linkages hinging opposite ends of the cover to the roof structure of the bus so that the cover can be tilted forward, tilted rearward or lifted away from the vehicle roof manually to vent the interior of the vehicle. Separable parts of one of the linkages are separated to permit the cover to be swung open fully to provide an escape hatch through the vehicle opening. Separation of the linkage parts is controlled by interior and exterior manual operators—an interior handle and an exterior knob. U.S. Pat. No. 4,964,673 granted to Ronald C. Lamparter Oct. 23, 1990 discloses another combined vent and escape hatch assembly of the same general type. The cover in the combined vent and escape hatch assemblies disclosed in these two patents is tilted or lifted away from the vehicle roof manually to vent the vehicle interior and pulled down manually to the closed position.

U.S. Pat. No. 6,572,182 granted to Ronald C. Lamparter et al. Jun. 3, 2003 discloses a vent and escape hatch assembly that is motorized, so that the cover is moved by motors to virtually any raised or tilted position or to a closed position. Separation of the linkage parts is still controlled manually to open the cover fully to provide an escape hatch.

The vent assemblies and the combined vent and escape hatches disclosed in these patents are satisfactory for their intended purpose and have been in commercial use for several years. However, further improvements are possible. For instance, the static vent assembly and the combined static and powered vent assembly disclosed in the Lamparter '269 patent and the Lamparter '065 patent both include a two-piece cover in which a smaller cover member is attached to a central region of a larger cover member. Both cover members are exposed to the environment which raises a number of concerns. First and foremost, the two-piece cover is erroneously perceived as providing a leakage path via the seam where the smaller cover member is attached to the larger cover member. The seam between the smaller cover member and the larger cover member collects dirt and is difficult to clean. Moreover, the two piece cover is not perceived as aesthetically pleasing or aerodynamically efficient.

On the other hand, the combined vent and escape hatch assemblies disclosed in the Manning '506 patent, the Lamparter '673 patent and the Lamparter et al. '182 patent do not provide any venting in the closed position nor prevent the ingress of rain water into the passenger compartment in any of its venting positions.

SUMMARY OF THE INVENTION

This invention provides a vent assembly for the roof of a vehicle, such as a school or transit bus in which the cover is a single piece to provide a vent assembly that is leak proof, aesthetically pleasing and aerodynamically efficient when the vent assembly is attached to the vehicle roof.

The vent assembly includes a static vent whereby the interior of the vehicle is continuously vented to the atmosphere in such a way so as to prevent the ingress of rain water into the vehicle compartment. The vent assembly may also include a powered fan unit for venting the vehicle interior when static or eductive venting inadequate.

Alternatively, the vent assembly may also serve as a cover in a combined vent and escape hatch assembly such as those disclosed in the '506, '673 and '182 patents discussed above by attaching linkages to the vent assembly for hinging opposite ends of the vent assembly to the vehicle roof. For such use, the vent assembly preferably includes spaces for interior and exterior operators for separating parts of one of the linkages and opening the vent assembly fully, and/or finger grips for pulling the vent assembly to the closed position. The vent assembly equipped with a powered fan device may also serve as a cover in a combined vent and escape hatch assembly. Another alternative is to include an interior light and lens.

The vent assembly of the invention is characterized by a single piece cover that preferably has an upper surface that is impervious to water. The vent assembly cover is attached to a base that has a vent inlet. The vent assembly preferably includes a partition member that cooperates with the base and the cover to form a vent passage that leads from the vent inlet to a vent outlet at the aft end of the cover, the vent passage including barriers preventing any water taken into the vent outlet from reaching the vent inlet.

The vent assembly may include a powered fan unit to provide a power vent.

The vent assembly may include a light unit and lens that is attached to the base or to the partition and juxtaposed the base.

The vent assembly may be attached to a vehicle roof by hinging opposite ends of the vent assembly to a mounting ring that is adapted for attachment to the roof of a transit bus or the like to outline a hole through the roof, so that the vent assembly can be lifted and/or tilted with respect to the roof for venting or opened fully to provide an escape through the hole in the roof.

The vent assembly of the invention may be especially shaped to serve as the cover for a combined vent and escape hatch assembly that can be tilted or lifted off a vehicle roof or moved to an open position to provide an escape hatch and may be shaped for such service.

Other features and advantages of the invention will become apparent from the following description of preferred embodiments in connection with the drawings that are briefly described below.

DETAILED DESCRIPTION OF PREFERRED EMBODIMENTS

Referring now to the drawings, a vent assembly 10 according to the invention is disclosed. The vent assembly 10 comprises a base 12, a single piece cover 14 that is attached to base 12 to form a housing 16 and a partition 18 that is inside the housing to establish a vent path from an inlet in base 12 to an outlet in cover 14 and a water barrier to prevent the flow of water from the outlet in cover 14 back to the inlet in base 12.

Base 12 may be made economically from a sheet of plastic material that is formed to shape by thermo-forming or the like. Base 12 has a rim 20 that is preferably in the form of a downwardly open U-shaped section and continuous to provide a rigid attachment for cover 14. The central portion of base 12 is depressed to provide a pan 22. The bottom of pan 22 has generally rectangular opening that serves as an inlet 24 into the housing 16. The sides of the pan 22 have elongated finger depressions 25. Finger depressions are an optional feature for a combined vent and escape hatch as explained below.

Cover 14 may also be made economically from a sheet of plastic material that is formed to shape by thermo-forming or the like. Cover 14 has a rim 26 that is preferably in the form of a downwardly extending flange and that is continuous except for a portion at the rear of cover 14 as explained below. Cover 14 has a generally parabolic dome 28, the nose of which faces forward. Cover 14 may include a styling depression 29 that outlines the forward portion of generally parabolic dome 28.

The forward portion of dome 28 is disposed over inlet 24. Dome 28 has at least one rearward extension 30 with a generally vertical deflector wall 31 that is spaced rearward of rim 26 at the lower end to form an outlet 32 for housing 16. The deflector wall 31 deflects environmental water away from outlet 32. Deflector wall 31 is preferably deep enough so that outlet 32 is substantially horizontal and the environmental water is deflected away from a direct horizontal path into any part of outlet 32. The rearward portion of dome 28 may include a depression 34 to provide space for an optional operating handle 36 as explained below. With such a depression, the rearward portion of dome 28 is bifurcated so that two extensions 30 provide an outlet 32 comprising two openings that are laterally spaced from each other. Depression 34 is also preferably shorter than dome 28 to end in a matching downwardly extending flange in alignment with rim 26.

Figure 1:
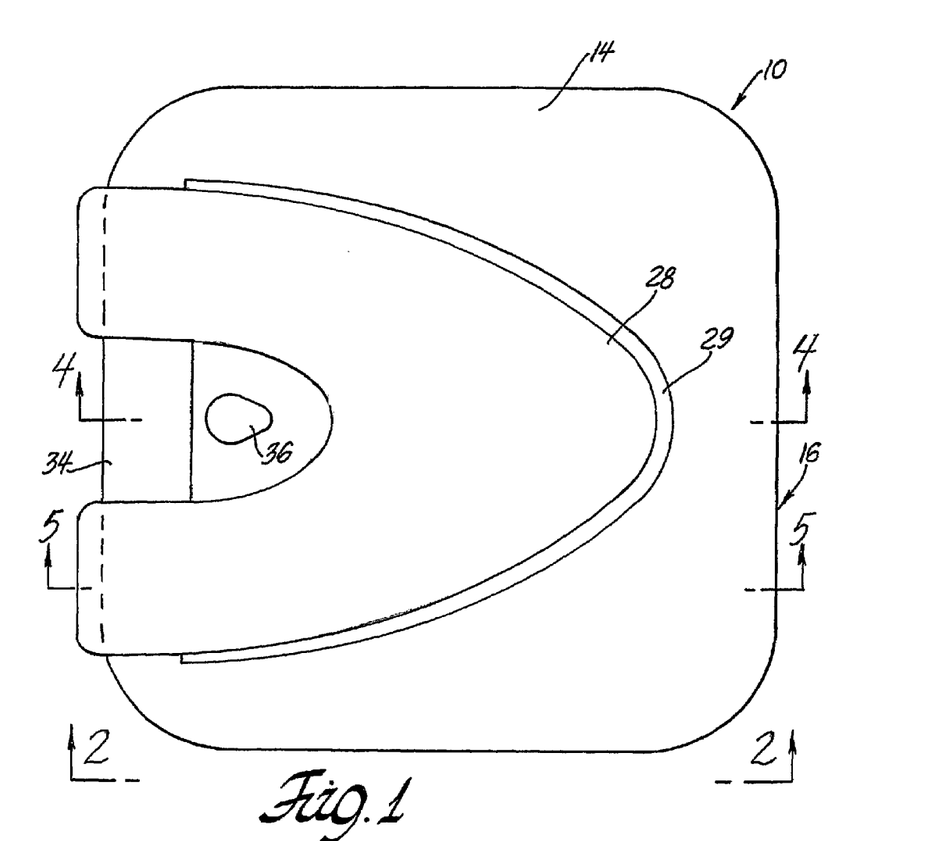
FIG. 1 is top view of a vent assembly in accordance with the invention.
Figure 2:
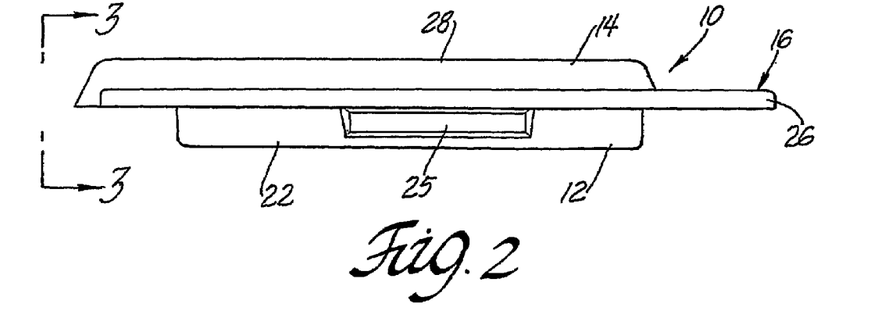
FIG. 2 is a side view of the vent assembly taken substantially along the line 2—2 of FIG. 1 looking in the direction of the arrows.
Figure 3:
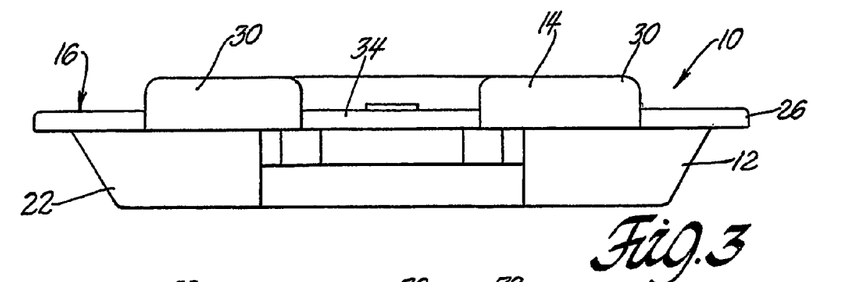
FIG. 3 is a rear view of the vent assembly taken substantially along the line 3—3 of FIG. 2 looking in the direction of the arrows.
Figure 4:
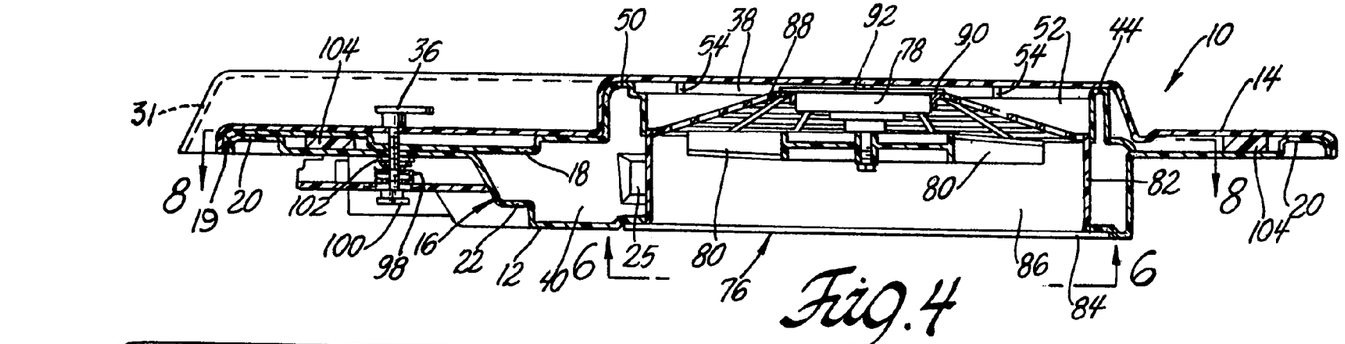
FIG. 4 is a longitudinal section view of the vent assembly taken substantially along the line 4—4 of FIG. 1 looking in the direction of the arrows.
Figures 5, 10, 10A:
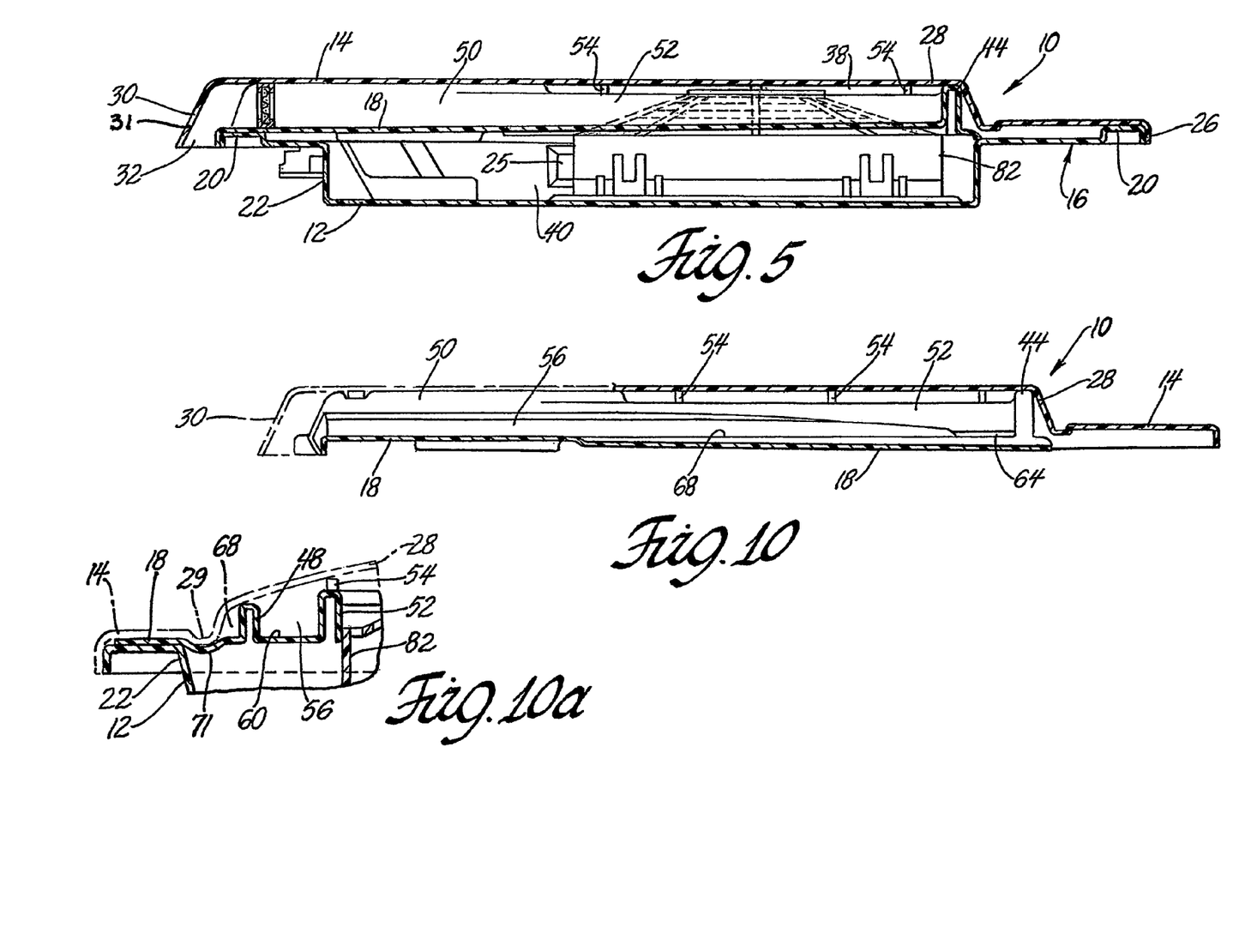
FIG. 5 is a longitudinal section taken substantially along the line 5—5 of FIG. 1 looking in the direction of the arrows.
FIG. 10 is a section taken substantially along the line 10—10 of FIG. 9 looking in the direction of the arrows.
FIG. 10a is a section taken substantially along the line 10a—10a of FIG. 9 looking in the direction of the arrows.
Figure 6:
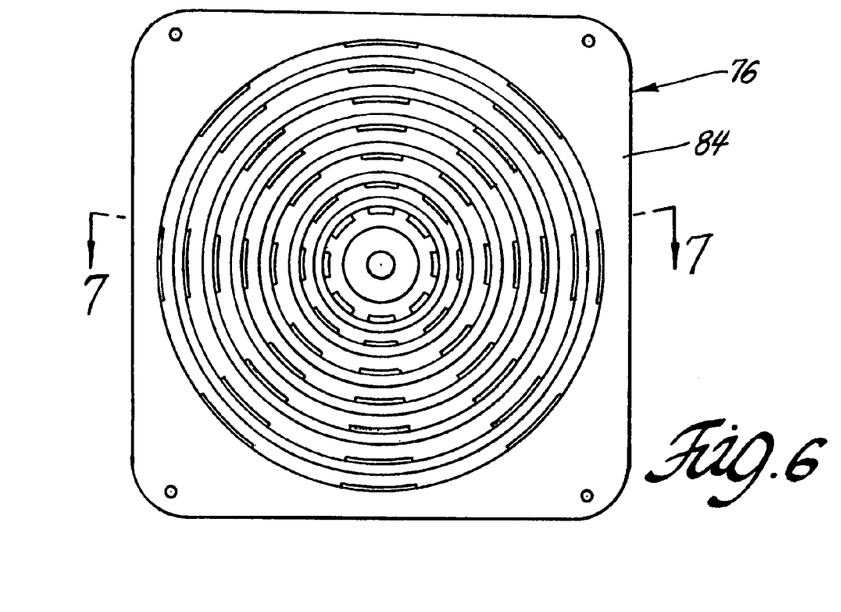
FIG. 6 is partial bottom view taken substantially along the line 6—6 of FIG. 4 looking in the direction of the arrows.
Figure 7:
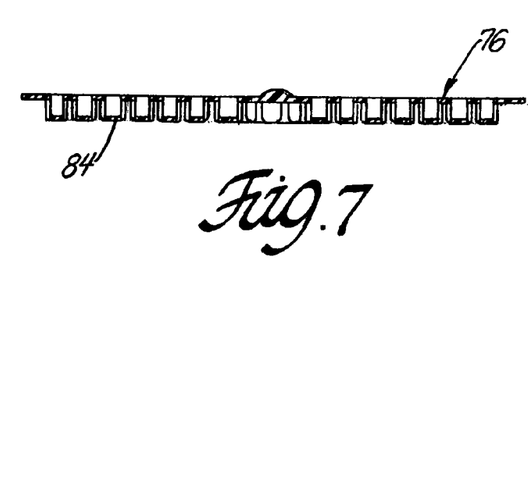
FIG. 7 is a section view taken substantially along the line 7—7 of FIG. 6 looking in the direction of the arrows.
Figure 8:
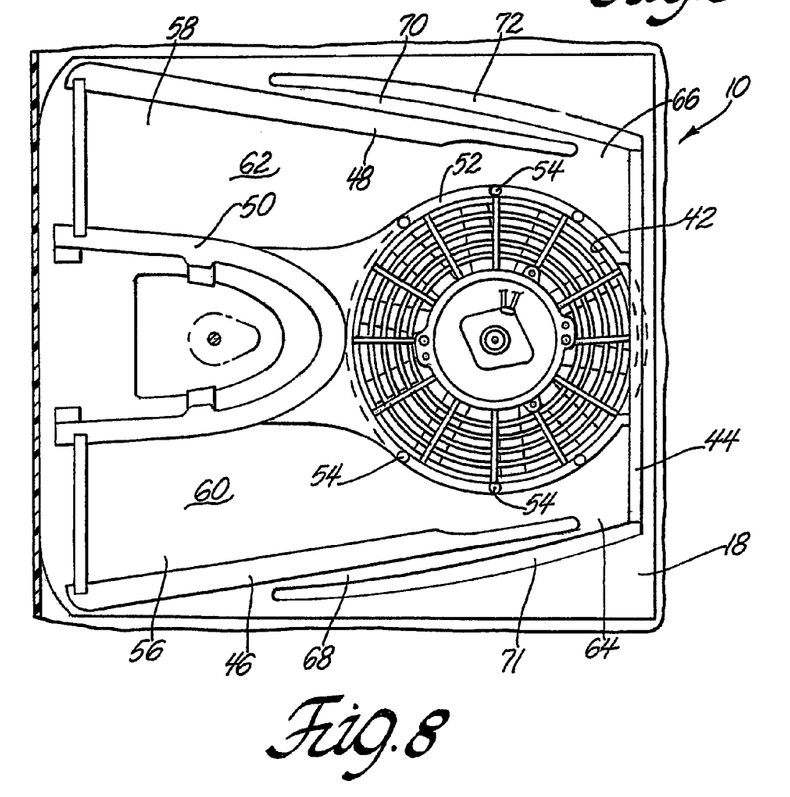
FIG. 8 is a section view taken substantially along the line 8—8 of FIG. 4 looking in the direction of the arrows.
Figure 9:
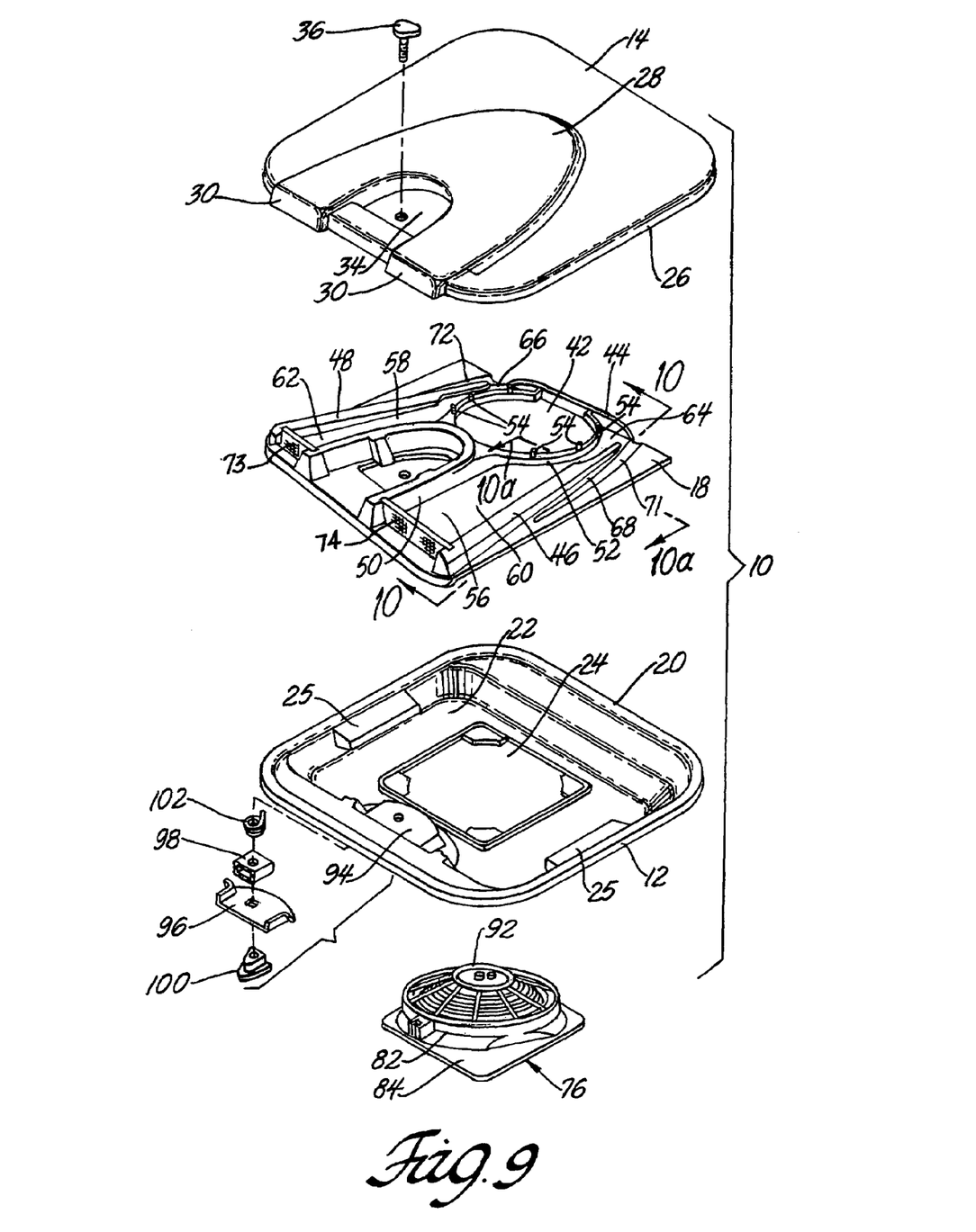
FIG. 9 is an exploded perspective view of the vent assembly.
Figure 11:
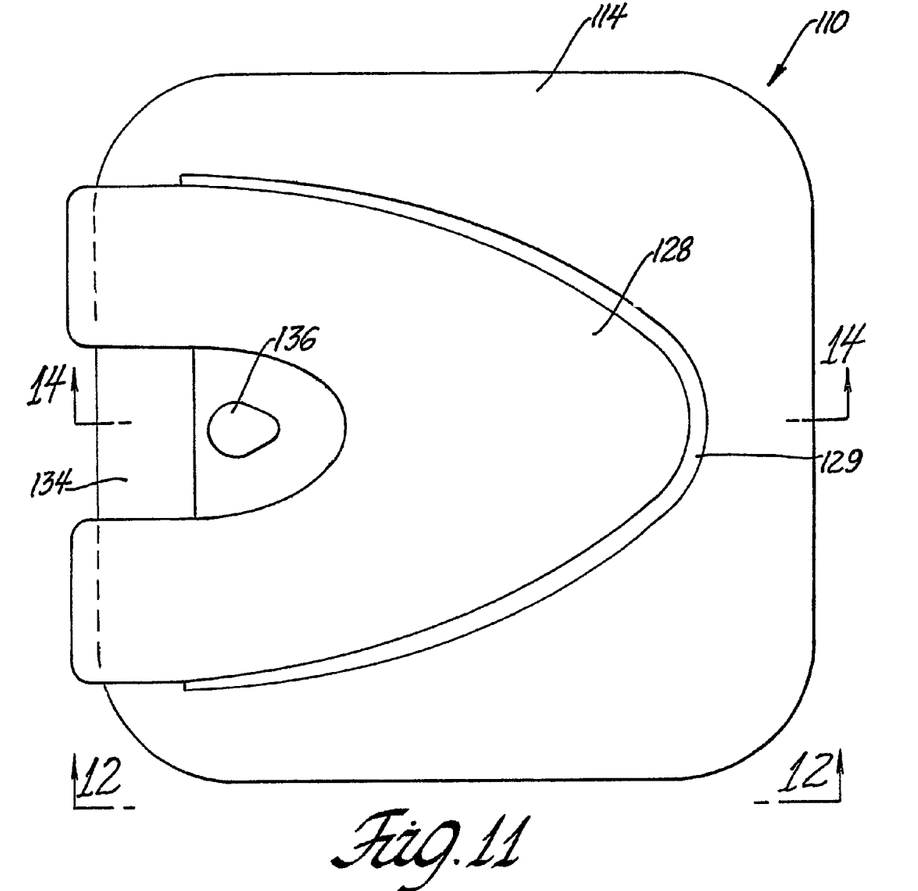
FIG. 11 is top view of a modified vent assembly in accordance with the invention.
Figure 12:
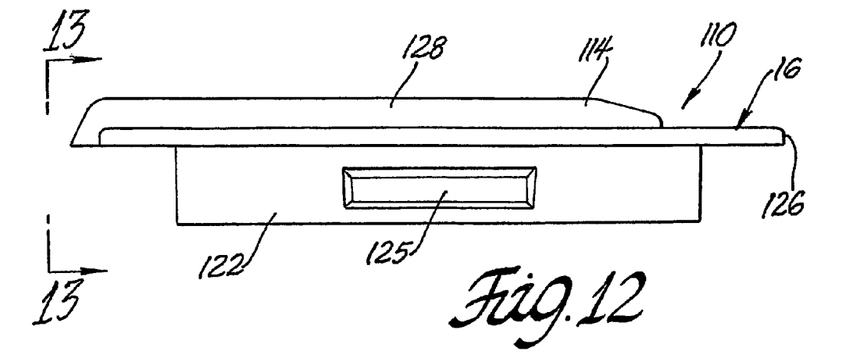
FIG. 12 is a side view of the modified vent assembly taken substantially along the line 12—12 of FIG. 11 looking in the direction of the arrows.
Figure 13:
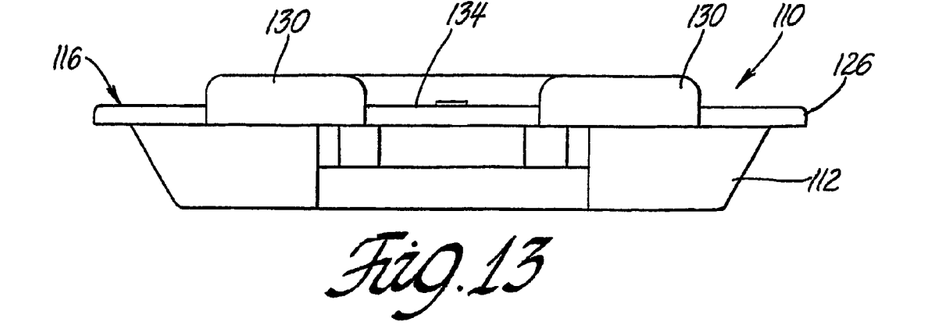
FIG. 13 is a rear view of the modified vent assembly taken substantially along the line 13—13 of FIG. 12 looking in the direction of the arrows.

Partition 18 may also be made economically from a sheet of material that is formed to shape by thermo-forming or the like. Partition 18 divides the interior of housing 16 into upper and lower compartments 38 and 40. Partition 18 has a large opening 42 that is aligned with inlet 24. Partition also has several ribs that engage the inside surface of cover 14 to form various passages in upper compartment 38. The several ribs include a forward tranverse rib 44 at the front of opening 42, side ribs 46 and 48 and a rear horseshoe rib 50. Opening 42 is on a platform 52 that extends from horseshoe rib 50 to forward rib 44. Platform 52 has a plurality of stand-offs 54 that engage cover 14 to provide an air flow path over platform 52 into exhaust passages 56 and 58 on either side of opening 42 between horseshoe rib 50 and platform 52 at the inside and the respective side ribs 46 and 48 at the outside. Partition 18 provides floors 60 and 62 for respective exhaust passages 56 and 58 that slant upwardly in the forward direction to drain paths 64 and 66 that are located between forward ends of the respective side ribs 46 and 48 and forward rib 44 as best shown in FIGS. 5 and 9. Drain paths 64 and 66 descend to respective drain passages 68 and 70 that are between the outer sides of the respective side ribs 46 and 48 and the side wall of dome 28 as best shown in FIGS. 10 and 10a The floors of drain passages 68 and 70 slant downwardly in the rearward direction to the outer portions of outlets 32 near the outer sides of extensions 30. Partition 18 further includes troughs 71 and 72 outwardly of drain passages 68 and 70. Troughs 71 and 72 receive portions of styling indentation 29 of cover 14. Cover 14 is preferably bonded, welded or otherwise suitably secured to the upper surfaces of forward rib 44, side ribs 46 and 48, horseshoe rib 50, and stand-offs 54. Styling depression 29 of cover 14 is also preferably bonded welded or otherwise suitably secured to the bottom of troughs 71 and 72. The rim 26 of cover 14 is also preferably bonded, welded or otherwise suitably secured to the outside of the rim 20 of base 12 with a rearward flange 19 of partition 18 sandwiched between the rims as best shown in FIG. 4. This securement strengthens the cover 14 as well as seals the various passages provided by partition 18.

The rearward ends of horseshoe rib 50 and side ribs 46 and 48 are notched to support filter screens 73 and 74 adjacent the respective ends of exhaust passages 56 and 58 near outlet 32. The screens 73 and 74 filter out insects, leaves and other debris.

Vent assembly 10 is a power vent and includes a fan assembly 76 that comprises an electric motor 78, a vaned rotor 80, a fan housing 82 and a grill 84. Fan housing 82, which may be an economical injection molded plastic part, comprises a generally circular shroud 86 that has an upper frusto-conical screen 88 that terminates in a mounting annulus 90. Electric motor 78 has an end plate 92 that is attached to the upper side of the mounting annulus 90 with the electric motor disposed in the upper end of the fan housing 82. Electric motor 90 is drivingly connected to the vaned rotor 80 which is inside the fan housing 82 as best shown in FIG. 4. Rotor 80 may be economically injection molded of a plastic material. Electric motor 78, rotor 80 and fan housing 82 are a sub-assembly. The bottom of fan housing 82 is attached to grill 84 to complete the fan assembly 76. Grill 84 may also be economically injection molded of a plastic material. The fan assembly 76 is attached to vent 10 by inserting the fan housing 82 into the inlet 24 of housing 14 so that the screen 88 protrudes into the upper compartment 38 and then attaching the grill 84 to the bottom of pan 22 at the four corners of the grill 84.

Housing shroud 86 is disposed in lower compartment 40 of vent housing 16 while screen 88 is disposed in upper compartment 38 as best shown in FIG. 4. Shroud 86 preferably seals against opening 42 of partition 18 when the fan assembly 76 is attached so that air is not blown into lower compartment 40.

Vent assembly 10 operates as follows. Rotor 80 draws air into shroud 86 through grill 84 covering inlet 24, and then pushes the air over platform 52 into exhaust passages 56 and 58 and out the openings of outlet 32 through filter screens 73 and 74. At the same time, vent assembly 10 provides several barriers that prevent any water entering outlet 32 from reaching inlet 24. The first barrier is the deflector wall 31 that at least inhibits and preferably completely blocks direct horizontal flow into exhaust passages 56 and 58. Next the exhaust passages 56 and 58 themselves which have floors 60 and 62 that slope upward in the forward direction so that any water getting past barrier wall 31 must flow up hill to the forward rib 44. At the forward rib 44 drain paths 64 and 66 descend outwardly to drain passages 68 and 70 inhibiting the accumulation of a large amount of water in exhaust passages 56 and 58 at the forward rib 44 where the height of platform 52 is smallest. The platform 52 requires an enormous accumulation of water in exhaust passages 56 and 58 before any water can spill over platform 52 and down into inlet 24. However, any minimal amount of water accumulating at the forward rib 44 drains out of vent assembly 10 via drain paths 64 and 66 and drain passages 68 and 70 that are connected to outlet 32 outside of side ribs 46 and 48 before enough water accumulates to spill over platform 52. Consequently vent assembly 10 not only vents the interior of a bus but also essentially prevents the back flow of any water into the passenger compartment.

As indicated in the introduction, the power vent assembly 10 may be used as a stand alone unit that is attached to a vehicle roof in a fixed manner. However, the power vent may also be used in conjunction with a combined vent and escape hatch such as disclosed in U.S. Pat. Nos. 4,495,731 and 4,964,673; or a combined vent and escape hatch assembly that is motorized, such as disclosed in U.S. Pat. No. 6,572,182. When the power vent 10 is used in conjunction with a combined vent and escape hatch, the entire power vent is the moveable hatch of the escape hatch. Consequently the front and rear ends of the power vent 10 are connected by over center hinges (not shown) to the vehicle roof, one of which would be separable to open the hatch for an emergency escape. In such instances, it is very desirable that the separable hinge be operable from both inside and outside the vehicle as indicated in U.S. Pat. No. 4,433,506 granted to Donald L. Manning Feb. 28, 1984. To this end, the vent 10 of the invention is contoured to provide room for interior and exterior handles to detach the separable hinge part and open the escape hatch. More specifically, the base 10 is provided with a raised platform 94 and may include an exterior adapter 96 for attaching a separable hinge part 98 and an inside operating knob 100 to the vent base 12 while the cover 14 includes depression 34 to provide room for the outside operating handle 36. As best shown in FIG. 9, handle 36 has a threaded stem that protrudes through holes in cover 14, base 10, hinge part 98 and adapter 96 and then screws into inside operating knob 100. Spring 102 biases hinge part 98 downwardly to an engaged position as shown in the Manning '506 patent. To separate hinge part 98 from the flexed hinge part attached to the bus roof, the hinge part 98 is lifted upwardly by outside operating handle 36 or pushed upwardly by inside operating knob 100.

Power vent assembly 10 also preferably includes two attachment pads 104 inside housing 16 near the fore and aft ends of the housing to facilitate attachment of the over center hinges (not shown) when the power vent assembly is used in conjunction with a combined vent and escape hatch. In this regard, it should be noted that the base 12 of the power vent assembly 10 also preferably includes finger depressions 25 so that the power vent assembly can be gripped and moved manually to any of its venting positions or to its closed position.

Referring now to FIGS. 1 through 18 of the drawings, a modified vent assembly 110 according to the invention is disclosed. The vent assembly 110 comprises a base 112, a single piece cover 114 that is attached to base 112 to form a housing 116 and a partition 118 that is inside the housing to establish a vent path from an inlet in base 112 to an outlet in cover 114 and a water barrier to prevent the flow of water from the outlet in cover 114 back to the inlet in base 112.

Base 112 may be made economically from a sheet of plastic material that is formed to shape by thermo-forming or the like. Base 112 has a rim 120 that is preferably in the form of a downwardly open U-shaped section and continuous to provide a rigid attachment for cover 114. The central portion of base 112 is depressed to provide a pan 122. The rearward wall of pan 122 has a plurality of openings that serve as an inlet 124 into the housing 116. The sides of the pan 122 have elongated finger depressions 125. Finger depressions are an optional feature for a combined vent and escape hatch as explained below.

Cover 114 may also be made economically from a sheet of plastic material that is formed to shape by thermo-forming or the like. Cover 114 has a rim 126 that is preferably in the form of a downwardly extending flange and that is continuous except for a portion at the rear of cover 114 as explained below. Cover 114 has a generally parabolic dome 128, the nose of which faces forward. Cover 14 may include a styling depression 129 that outlines the forward portion of generally parabolic dome 28.

The forward portion of dome 128 is disposed over a forward potion of partition 118 as explained below. Dome 128 has at least one rearward extension 130 with a, generally vertical wall that is spaced rearward of rim 126 at the lower end to form an outlet 132 for housing 116. The deflector wall 131 deflects environmental water away from outlet 132. Deflection wall 131 is preferably deep enough so that outlet 132 is substantially horizontal and the environmental water is deflected away from a direct horizontal path into any part of outlet 132. The rearward portion of dome 128 may include a depression 134 to provide space for an optional operating handle 136 as explained below. With such a depression, the rearward portion of dome 128 is bifurcated so that two extensions 130 provide an outlet 132 comprising two that are laterally spaced from each other. Depression 134 is also preferably shorter than dome 128 to end in a matching downwardly extending flange in alignment with rim 126.

Figures 16, 18:
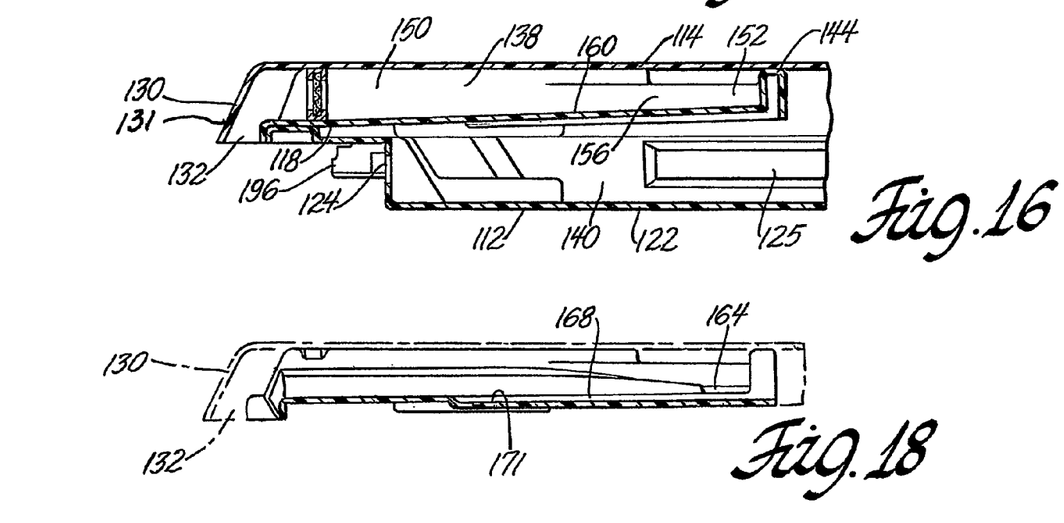
FIG. 16 is a section taken substantially along the line 15—15 of FIG. 15 looking in the direction of the arrows.
FIG. 18 is a section taken substantially along the line 18—18 of FIG. 17 looking in the direction of the arrows.
Figure 17:
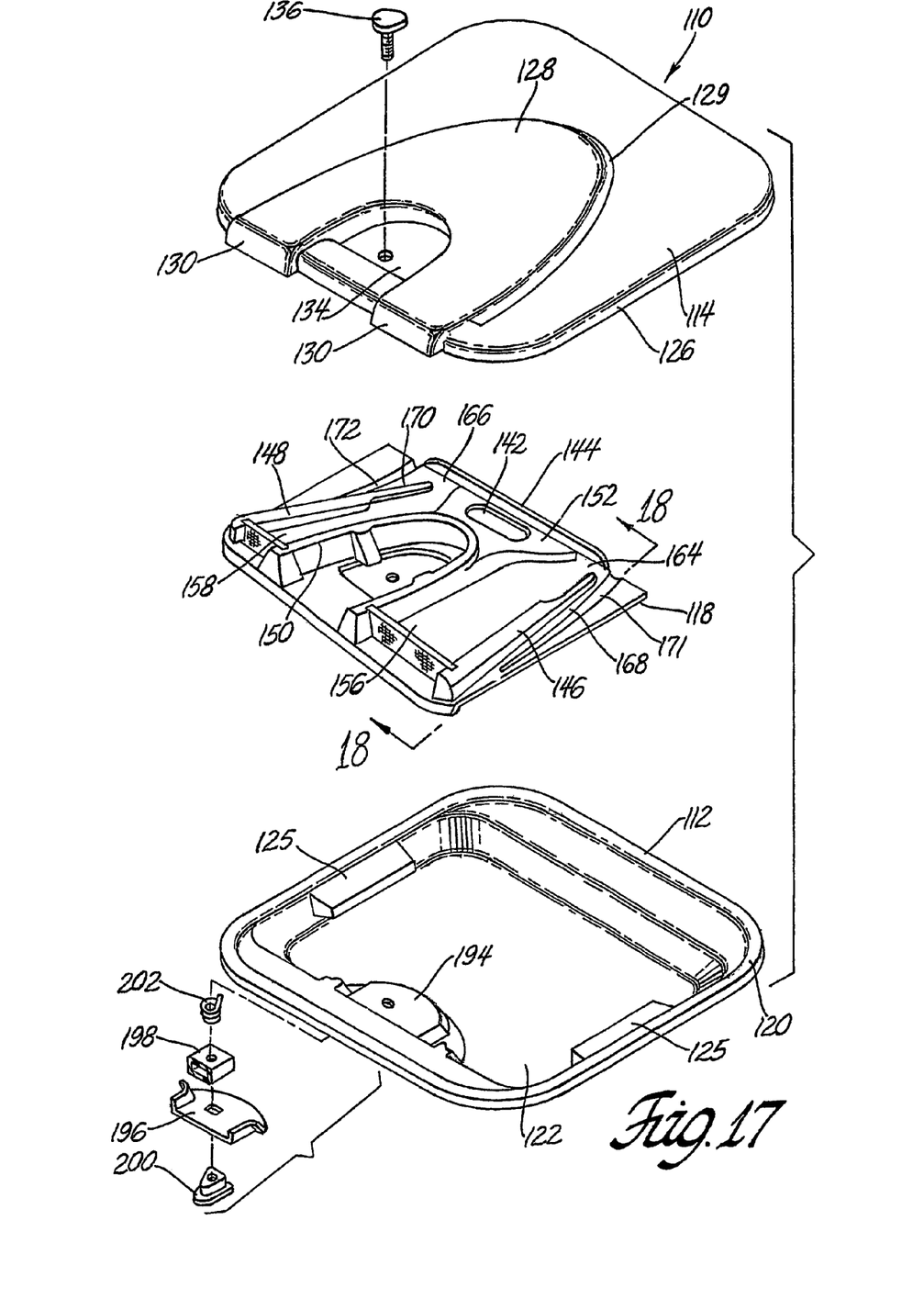
FIG. 17 is an exploded perspective view of the modified vent assembly.

Partition 118 may also be made economically from a sheet of material that is formed to shape by thermo-forming or the like. Partition 118 divides the interior of housing 116 into upper and lower compartments 138 and 140 that communicate with each other through an opening 142 in partition 118. Partition 118 also has several ribs that engage the inside surface of cover 13 to form various passages in upper compartment 138. The several ribs include a forward tranverse rib 144 at the front of opening 142, side ribs 146 and 148 and a rear horseshoe rib 150. Opening 142 is surrounded by a raised platform 152 that extends from horseshoe rib 150 to forward rib 144. Platform 152 is spaced from cover 114 to provide an air flow path over platform 152 into exhaust passages 156 and 158 on either side of opening 142 between horseshoe rib 150 and platform 152 at the inside and the respective side ribs 146 and 148 at the outside. Partition 118 provides floors 160 and 162 for respective exhaust passages 156 and 158 that slant upwardly in the forward direction to drain paths 164 and 166 between respective died ribs 146 and 148 and forward rib 144 as best shown in FIG. 16. Drain paths 164 and 166 descend to drain passages 168 and 170 that are between the outer sides of the respective side ribs 146 and 148 and the side wall of dome 128. The floors of drain passages 168 and 170 slant downwardly in the rearward direction to the outer portions of outlet 132 near the outer sides of extensions 130 as best shown in FIG. 17. Partition 118 further includes troughs 171 and 172 outwardly of drain passages 168 and 170. Troughs 171 and 172 receive portions of styling indentation 129 of cover 114.

Figure 14:
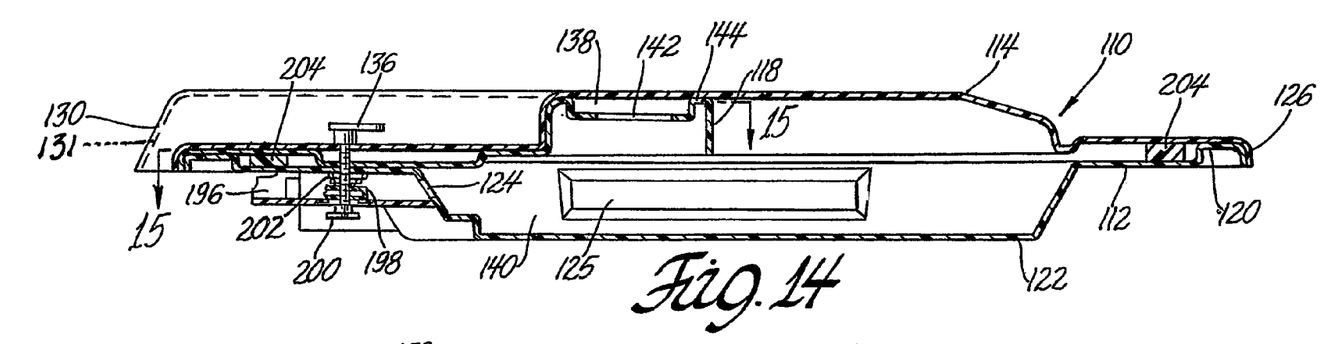
FIG. 14 is a longitudinal section view of the modified vent assembly taken substantially along the line 14—14 of FIG. 11 looking in the direction of the arrows.
Figure 15:
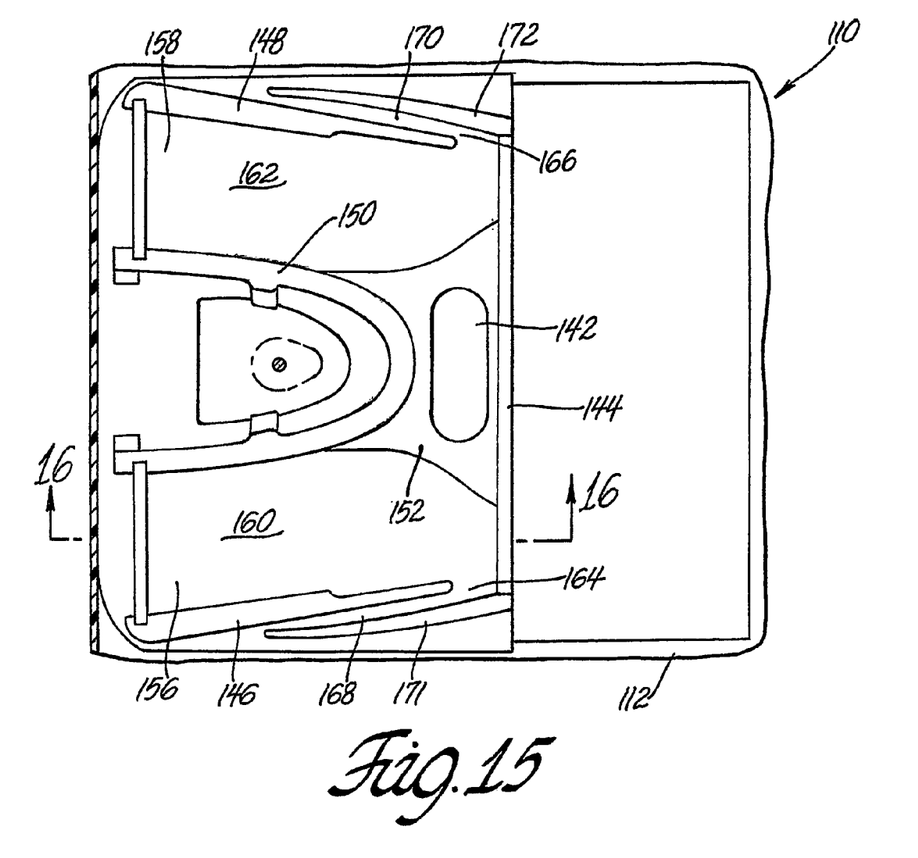
FIG. 15 is a section taken substantially along the line 15—15 of FIG. 14 looking in the direction of the arrows.

Cover 114 is preferably bonded, welded or otherwise suitably secured to the upper surfaces of forward rib 144, side ribs 146 and 148 and horseshoe rib 150. Styling depression 129 of cover 114 is also preferably bonded welded or otherwise suitably secured to the bottom of troughs 171 and 172. The rim 126 of cover 114 is also preferably bonded, welded or otherwise suitably secured to he outside of the rim 120 of base 112 with a rearward flange 119 of partition 118 sandwiched between as best shown in FIG. 14. This securement strengthens the cover 114 as well as seals the various passages provided by partition 118.

The rearward ends of horseshoe rib 150 and side ribs 146 and 148 are notched to support filter screens 173 and 174 adjacent the respective ends of exhaust passages 156 and 158 near outlet 132. The screens 173 and 174 filter out insects, leaves and other debris.

Vent assembly 110 is a static vent and does not include a fan assembly as in the case of the vent assembly 10 described above.

Vent assembly 110 operates as follows. When the vent assembly 110 is attached to a bus roof and the bus travels forward, a vacuum or negative pressure is created at outlet 32. This vacuum draws air into upper chamber 138 and then into lower chamber 140 through inlet 128 and through opening 142 into exhaust passages 156 and 158 and out the openings of outlet 132 through filter screens 173 and 174. At the same time, vent assembly 110 provides several barriers that prevent any water entering outlet 132 from reaching inlet 124. The first barrier is the deflector wall 131 that at least inhibits and preferably completely blocks direct horizontal flow into exhaust passages 56 and 58. Next the exhaust passages 156 and 158 themselves have floors 160 and 162 that slope upward in the forward direction so that any water getting past barrier wall 131 must flow up hill to the forward rib 144. At the forward rib 144 drain paths 164 and 166 descend outwardly to drain passages 168 and 170 inhibiting the accumulation of a large amount of water in exhaust passages 136 and 158 at the forward rib 144 where the height of platform 152 is smallest. The platform 152 requires an enormous accumulation of water in exhaust passages 156 and 158 before any water can spill over platform 152 and down into inlet 124. However, any minimal amount of water accumulating at the forward rib 144 drains out of vent assembly 110 via drain paths 164 and 166 and drain passages 168 and 170 that are connected to outlet 132 outside of side ribs 146 and 148 before enough water accumulates to spill over platform 152. Consequently vent assembly 10 not only vents the interior of a bus but also essentially prevents the back flow of water into the passenger compartment.

As indicated in the introduction, the static vent assembly 110 may be used as a stand alone unit that is attached to a vehicle roof in a fixed manner. However, the power vent may also be used in conjunction with a combined vent and escape hatch such as disclosed in U.S. Pat. Nos. 4,495,731 and 4,964,673; or a combined vent and escape hatch assembly that is motorized, such as disclosed in U.S. Pat. No. 6,572, 182. When the static vent 110 is used in conjunction with a combined vent and escape hatch, the entire power vent is the moveable hatch of the escape hatch. Consequently the front and rear ends of the static vent 110 are connected by over center hinges (not shown) to the vehicle roof, one of which would be separable to open the hatch for an emergency escape. In such instances, it is very desirable that the separable hinge be operable from both inside and outside the vehicle as indicated in U.S. Pat. No. 4,433,506 granted to Donald L. Manning Feb. 28, 1984. To this end, the vent 110 of the invention is contoured to provide room for interior and exterior handles to detach the separable hinge part and open the escape hatch. More specifically, the base 110 is provided with a raised platform 194 and may include an exterior adapter 196 for attaching a separable hinge part 198 and an inside operating knob 200 to the vent base 112 while the cover 114 includes depression 134 to provide room for the outside operating handle 136. As best shown in FIG. 17, handle 136 has a threaded stem that protrudes through holes in cover 114, base 110, hinge part 198 and adapter 196 and then screws into inside operating knob 200. Spring 202 biases hinge part 198 downwardly to an engaged position as shown in the Manning '506 patent. To separate hinge part 198, the hinge part is lifted upwardly by outside operating handle 136 or pushed upwardly by inside operating knob 200.

Static vent assembly 110 also preferably includes two attachment pads 204 inside housing 16 near the fore and aft ends of the housing to facilitate attachment of the over center hinges (not shown) when the static vent assembly is used in conjunction with a combined vent and escape hatch. In this regard, it should be noted that the static vent assembly 110 also preferably includes finger depressions 125 so that the static vent assembly can be gripped and moved manually to any of its venting positions or to its closed position.

The description and drawings illustratively set forth my presently preferred invention embodiments. I intend the description and drawings to describe these embodiments and not to limit the scope of the invention. Obviously, it is possible to modify these embodiments while remaining within the scope of the following claims. Therefore, within the scope of the claims, one may practice the invention otherwise than as the description and drawings specifically show and describe.

We claim:

1. A vent assembly for attachment to the roof of a vehicle comprising;
    a base having an inlet extending through a wall of the base,
    a single piece cover attached to the base to form a vent housing,
    an outlet at the rear end of the cover, and
    a partition disposed in the housing to provide an exhaust passage from the inlet to the outlet,
    the partition providing a barrier inhibiting water flow from the outlet back to the inlet, and
    the single piece cover having a larger footprint than the partition disposed in the housing so that the vent assembly has a seamless top surface.

2. The vent assembly as defined in claim 1 wherein the partition defines an upper compartment and a lower compartment that communicates with the upper compartment via an opening through the partition, the partition providing a baffler inhibiting water flowing from the outlet back through the inlet via the opening through the partition.

3. The vent assembly as defined in claim 2 wherein the partition has a platform that is above the outlet and wherein the opening through the partition is through the platform.

4. The vent assembly as defined in claim 3 wherein the inlet is through a rear wall of the base.

5. The vent assembly as defined in claim 3 wherein the inlet comprises a plurality of openings through a rear wall of the base.

6. The vent assembly as defined in claim 3 wherein the inlet is through a bottom wall of the base and the opening of the partition is aligned with the inlet.

7. The vent assembly as defined in claim 6 further comprising a fan unit that extends through the inlet and the opening of the partition.

8. The vent assembly as defined in claim 7 wherein the fan unit comprises a fan housing that is attached to a grill that is attached to the base of the vent assembly.

9. The vent assembly as defined in claim 7 wherein the fan housing has a screen at an upper end that is disposed in the upper compartment of the vent housing.

10. The vent assembly as defined in claim 7 wherein the fan housing seals against the opening through the partition.

11. The vent assembly of claim 1 wherein the cover has a deflector wall at a rear end of the cover to inhibit water flow into the outlet.

12. The vent assembly of claim 11 wherein the deflector wall is deep enough so that the outlet is substantially horizontal.

13. A vent assembly for attachment to the roof of a vehicle comprising;
    a base having an inlet extending through a wall of the base,
    a single piece cover attached to the base to form a vent housing,
    an outlet at the rear end of the cover, and
    a partition disposed in the housing to provide an exhaust passage from the inlet to the outlet,
    the partition providing a barrier inhibiting water flow from the outlet back to the inlet,
    the base having a rim, and
    the single piece cover having a rim that is disposed outside of the rim of the base.

14. The vent assembly as defined in claim 13 wherein the perimeter of the partition is inside the rim of the single piece cover.

15. The vent assembly of claim 14 wherein the cover has an upper surface that is impervious to water.

16. A vent assembly for attachment to the roof of a vehicle comprising;
    a base having an inlet extending through a wall of the base,
    a single piece cover attached to the base to form a vent housing,
    an outlet at the rear end of the cover, and
    a partition disposed in the housing to provide an exhaust passage from the inlet to the outlet,
    the partition providing a barrier inhibiting water flow from the outlet back to the inlet wherein the partition defines an upper compartment and a lower compartment that communicates with the upper compartment via an opening through the partition,
    the partition providing a barrier inhibiting water flowing from the outlet back through the inlet via the opening through the partition,
    the partition having a platform that is above the outlet and wherein the opening through the partition is through the platform, and
    wherein the exhaust passage has a floor that slants upwardly from the outlet toward the forward end of the platform.

17. The vent assembly as defined in claim 16 wherein the exhaust passage comprises laterally spaced longitudinal ribs that are disposed on either side of the opening through the partition, and spaced from the platform.

18. The vent assembly as defined in claim 17 further comprising a drain passage between the laterally spaced longitudinal ribs of partition and a wall of the cover.

19. The vent assembly as defined in claim 18 wherein the drain passage extends to the outlet and has a floor that slants downwardly in the rearward direction.

20. The vent assembly as defined in claim 19 wherein the cover has a dome and wherein the drain passage is between the laterally spaced longitudinal ribs of the partition and a side wall of the dome.

21. The vent assembly as defined in claim 19 wherein the cover has a styling depression adjacent the dome and the partition has longitudinal troughs outward of the laterally spaced longitudinal ribs of the partition that receive portions of the styling depression of the cover.

22. The vent assembly as defined in claim 19 wherein the partition has a traverse rib across respective forward ends of the exhaust passage and the drain passage and wherein the exhaust passage is connected to the drain passage by a descending drain path at the traverse rib.

* * * * *

UNITED STATES PATENT AND TRADEMARK OFFICE
CERTIFICATE OF CORRECTION

PATENT NO. : 7,166,023 B2  Page 1 of 1
APPLICATION NO. : 10/503190
DATED : January 23, 2007
INVENTOR(S) : James A. Haigh et al.

It is certified that error appears in the above-identified patent and that said Letters Patent is hereby corrected as shown below:

Column 7, line 18 after "two" insert --openings--

Claim 2, column 9, line 39 after "a" delete "baffler" and insert --barrier--

Signed and Sealed this

Twenty-eighth Day of August, 2007

JON W. DUDAS
*Director of the United States Patent and Trademark Office*